(12) United States Patent
Takita

(10) Patent No.: US 8,121,477 B2
(45) Date of Patent: Feb. 21, 2012

(54) OPTICAL NODE APPARATUS

(75) Inventor: Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 431 days.

(21) Appl. No.: 12/504,142

(22) Filed: Jul. 16, 2009

(65) Prior Publication Data

US 2009/0274459 A1    Nov. 5, 2009

Related U.S. Application Data

(63) Continuation of application No. PCT/JP2007/053830, filed on Feb. 28, 2007.

(51) Int. Cl.
*H04J 14/00* (2006.01)

(52) U.S. Cl. ............... 398/48; 398/49; 398/50; 398/51

(58) Field of Classification Search ............ 398/48–51
See application file for complete search history.

(56) References Cited

U.S. PATENT DOCUMENTS

| | | |
|---|---|---|
| 6,704,508 B1 | 3/2004 | Asahi |
| 7,187,814 B2 | 3/2007 | Noguchi et al. |
| 7,308,168 B2 | 12/2007 | Takita et al. |
| 2005/0271314 A1 | 12/2005 | Noguchi et al. |
| 2006/0219870 A1 | 10/2006 | Kai et al. |
| 2006/0222289 A1 | 10/2006 | Takita et al. |

FOREIGN PATENT DOCUMENTS

| | | |
|---|---|---|
| JP | 2000-358261 | 12/2000 |
| JP | 2005-217501 | 8/2005 |
| JP | 2005-348270 | 12/2005 |
| JP | 2006-284765 | 10/2006 |
| JP | 2006-287453 | 10/2006 |
| JP | 2006-340208 | 12/2006 |

OTHER PUBLICATIONS

Kai, et al., "4×4 High Speed Switching Subsystem with VOA (<10 μs) Using PLZT Beam-Deflector for Optical Burst Switching", OFJ7, 2006.
International Search Report mailed May 22, 2007 for International Application No. PCT/JP2007/053830.

*Primary Examiner* — Shi K Li
(74) *Attorney, Agent, or Firm* — Staas & Halsey LLP

(57) ABSTRACT

The present invention is directed to an optical node apparatus in which the number of light elements that propagates reference light is reduced, which includes pa input-side wavelength mux/demux elements, a switch module, pb output-side wavelength mux/demux elements, and a reference light source. Each of the input-side wavelength mux/demux element include at least two first port and at least two second port. One of the first ports included in each input-side wavelength mux/demux element is coupled to an input transmission path. The other of the first ports coupled to the reference light source, and each of the second ports is coupled to an input end of the switch module.

13 Claims, 11 Drawing Sheets

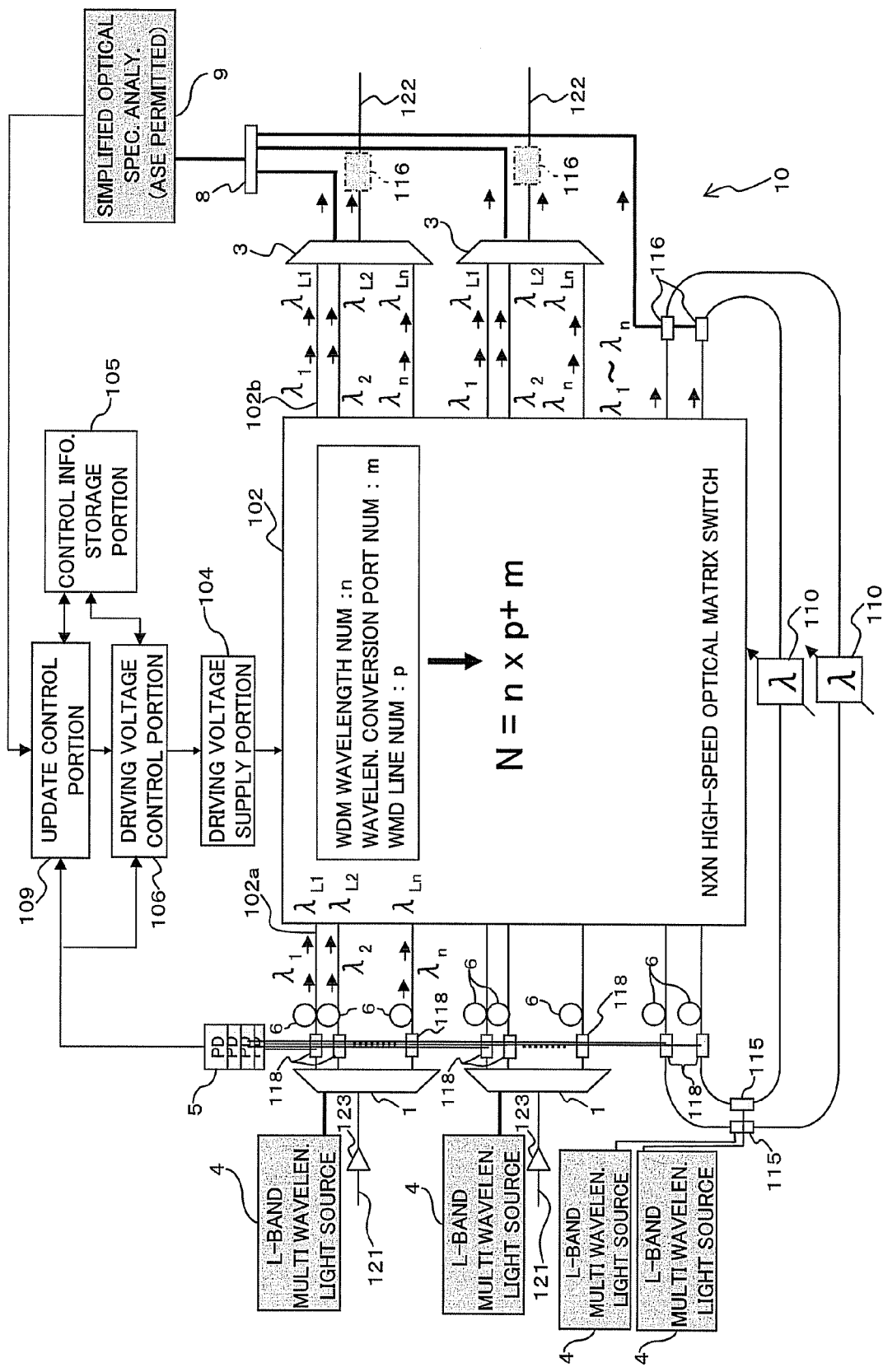

| | INPUT C-BAND MULTI WAVELEN. LIGHT FROM 1a-1 ($\lambda_1 \sim \lambda_n$) | INPUT L-BAND MULTI WAVELEN. LIGHT FROM 1a-2 ($\lambda_{L1} \sim \lambda_{Ln}$) |
|---|---|---|
| OUTPUT WAVELENGTH FROM 1b-1 | $\lambda_1$ | $\lambda_{L1}$ |
| OUTPUT WAVELENGTH FROM 1b-2 | $\lambda_2$ | $\lambda_{L2}$ |
| .... | .... | .... |
| OUTPUT WAVELENGTH FROM 1b-(n-1) | $\lambda_{n-1}$ | $\lambda_{L(n-1)}$ |
| OUTPUT WAVELENGTH FROM 1b-n | $\lambda_n$ | $\lambda_{Ln}$ |

| | INPUT MULTI WAVELEN. LIGHT FROM PORT 1a-1 ($\lambda_1 \sim \lambda_n$) | INPUT MULTI WAVELEN. LIGHT FROM PORT 1a-2 ($\lambda_1 \sim \lambda_n$) |
|---|---|---|
| OUTPUT WAVELENGTH FROM PORT 1b-1 | $\lambda_1$ | $\lambda_2$ |
| OUTPUT WAVELENGTH FROM PORT 1b-2 | $\lambda_2$ | $\lambda_3$ |
| .... | .... | .... |
| OUTPUT WAVELENGTH FROM PORT 1b-(n-1) | $\lambda_{n-1}$ | $\lambda_n$ |
| OUTPUT WAVELENGTH FROM PORT 1b-n | $\lambda_n$ | $\lambda_1$ |

OPTICAL NODE APPARATUS

CROSS REFERENCE TO RELATED APPLICATION(S)

This application is a continuation Application of a PCT international application No. PCT/JP2007/053830 filed on Feb. 28, 2007 in Japan, the entire contents of which are incorporated by reference.

FIELD

The embodiments a disclosed herein relates to an optical node apparatus, and more specifically, to an optical node apparatus that is preferred for using a high-speed WDM optical switching having a switching response performance of sub-microsecond for an optical burst/packet switching.

BACKGROUND

In photonic networks in metro access areas, network configurations are often changed due to exchanging or destination path switching of lines, such as in the add drop multiplexing (ADM) or the like, or signals. At relaying stages in the today's networks or the like, there are a lot of configurations in which signal switching are achieved by converting optical signals into electrical signals, which are subsequently converted back to optical signals.

However, from now on, in order to improve the performance desired for networks, it is expected that replacement to the dynamic optical add drop multiplexing (OADM) technique that can isolate only desired wavelengths from optical signals for increasing the speed of switching processing or cross-connect nodes that can switch input/output destination paths of un-converted optical signals on a wavelength basis.

Furthermore, in the next generation, in order to improve utilization efficiencies of lines, the processing is expected to be needed which divides optical signals into frames having a fixed length, and exchange or switch destination paths of the un-converted optical signals on a frame basis.

As a network for achieving effective operations of video distribution, data backup between data centers, grid computing, networks that carry out the above-described optical burst signal processing are promising. For achieving such networks, development of wide-scale WDM switching nodes having a high performance in terms of a response speed of optical burst switching in the order of microseconds (µs).

One example of an apparatus that carries out the above-described optical burst signal processing includes the one disclosed in, for example, Patent Reference 1. The technique disclosed in Patent Reference 1 focuses on the configuration of an optical switch apparatus that switches optical destination paths between input ends and output ends the number of which corresponds to input/output ports. For switching frame signal light that is wavelength division multiplexed (WDM) on a wavelength or frame basis, the configuration of an optical node apparatus depicted in FIG. 10 or FIG. 11, for example, is assumed.

Here, in an optical node apparatus 100 depicted in FIG. 10, wavelength division multiplexed frame signal light from a certain number (here, p that is two or more) of input transmission paths 121 is wavelength division demultiplexed at input-side wavelength mux/demux elements 101 that are formed by arrayed waveguide gratings (AWG) or the like into frame signal light for each channel and input into an N×N optical matrix switch 102. Note that the reference numeral 123 refers to WDM optical amplifiers that are inserted between the input transmission paths 121 and the input-side wavelength mux/demux elements 101.

The optical matrix switch 102 includes input ends (input ports) that receive frame signal light of each channel for wavelength division multiplexed frame signal light from the p input transmission paths 121, and includes output ends (output ports) that direct the frame signal light input from each input end to multiple (i.e., p in this example) output transmission paths 122 for each channel on a frame basis. In addition, the light output from the output ends of the optical matrix switch 102 is wavelength division multiplexed at wavelength division multiplexing portions 103 that are formed from AWGs or the like before the light is entered into the output transmission paths 122.

Here, the optical matrix switch 102 can be constructed as a deflection optical switch having a light deflection element that deflects input light upon application of a driving voltage, similar to the switch module described in the above-identified Patent Reference 1. More specifically, by driving the light deflection element with the driving voltage supplied from the driving voltage supply portion 104, the optical matrix switch 102 can form optical destination paths that are constructed from combinations of input ends and output ends. Note that another configuration of the optical matrix switch 102 includes the one disclosed in Non-Patent Reference 1.

In addition, a control information storage portion 105 stores information on the driving voltage to be provided at the above-described driving voltage supply portion 104 according to the optical destination paths to be established. A driving voltage control portion 106 outputs a control signal to the driving voltage supply portion 104 for controlling the driving voltage to be provided to the light deflection element included in the switch module 102 by looking up the contents on the control information storage portion 105 according to the optical destination paths to be established.

Note that the optical level of a respective frame for each channel that is output from the optical matrix switch 102 to each output transmission path 122 is equalisized by means of the variable attenuation (VOA) adjustment of the above-described driving voltage in the optical matrix switch 102. The information on the driving voltage for the variable attenuation control is stored in the control information storage portion 105.

More specifically, the level of frame signal light of each channel that is wavelength division demultiplexed at the input-side wavelength mux/demux elements 101 is monitored by the input signal light monitors 111 formed by photo diodes via photo couplers 118. A target attenuation additional amount is derived at the driving voltage control portion 106 by subtracting the inherent loss at the optical matrix switch 102 and the wavelength division multiplexing portion 103 from the monitor result. The driving voltage information for achieving the target attenuation additional amount value is obtained from the control information storage portion 105, and provided to the driving voltage supply portion 104 as a control signal. Thereby, equalization of the level of the light that is undergone the destination path switching processing and is output from each output end is achieved.

Note that reference numeral 110 refers to a wavelength converting portion that carries out a predetermined wavelength conversion on particular frame signal light that is to be input into the optical matrix switch 102 requiring wavelength conversion. For this purpose, the optical matrix switch 102 includes output ends for setting routes via the wavelength converting portion 102, and input ends for receiving frame signal light again into the optical matrix switch 102, wherein the light is underdone wavelength conversion processing to direct to the output transmission paths 122 for destination path switching.

Accordingly, assuming that the number of the both input ends and the output ends coupled to the above-described wavelength converting portion 110 is m, the numbers of the input/output transmission path 121 and 122 are p. Assuming that the number of the maximum channel that can be accommodated for wavelength division multiplexing at each of the input/output transmission path 121 and 122 (i.e., the number of light to be wavelength division demultiplexed at the input-side wavelength mux/demux element) is n, the number N of the input/output ends of the optical matrix switch 102 can be expressed as $N=n \times p+m$.

In addition, an update control portion 109 is configured to store and manage, in the control information storage portion 105, driving voltage information that is used for coupling an input end and an output end for expected destination path switching before operation of the apparatus is initiated and driving voltage information for the variable attenuation control. The update control portion 109 is appropriately configured to update and control driving voltage information for optical destination paths that are actually operated but setting of destination paths are waited, and driving voltage information for variable attenuation control.

For this purpose, the optical node apparatus 100 depicted in FIG. 10 is configured to monitor the level of input/output light of reference light at optical destination paths that are not operated or are waiting to be operated between input/output ends of the optical matrix switch 102. The update control portion 109 is configured to update and control driving voltage information stored in the control information storage portion 105 by monitoring the input/output level of the reference light to the optical destination path.

Here, as a configuration for monitor the input/output level of the above-described reference light, provided are: a light source 112, for example, in the L (Long) band that is different from the C (conventional) band used as the wavelength band wavelength band of the frame signal light; an input reference optical monitor 113 that monitors the level of the L-band light output from the light source 112 as an input reference light level; a 1×N coupler 114 for dividing the light from the light source 112 into N reference light; a C/L separation coupler 115 for bundling each reference light divided by the 1×N coupler 114 into respective N input ends included in the optical matrix switch 102; respective C/L separation couplers 116 for extracting the above-described reference light on light propagation path for propagating each frame signal light output from each of the N output ends; and an output reference optical monitor 117 that monitors each output reference light in the L-band from the C/L separation couplers 116.

Thereby, the update control portion 109 directs the reference light from the light source 112 to the optical destination path to be updated at the optical matrix switch 102, and updates and controls the driving voltage information stored in the control information storage portion 105 based on the monitor result from the above-described input reference optical monitor 113 and the output reference optical monitor 117.

An optical node apparatus 130 depicted in FIG. 11 is different from the optical node apparatus 100 depicted in FIG. 10, and includes a light source 112A that outputs light in the wavelength band substantially the same as that of frame signal light (C-band). The reference light from the light source 112A is propagated through optical circulators 119a and 119b provided on both of the output end side and the input end side of the optical matrix switch 102, from the output ends of the optical matrix switch 102 towards the input ends (i.e., at the direction opposite to the propagation direction of the frame signal light). In this case, similar to the case in the optical node apparatus 100 depicted in FIG. 10, the update control portion 109 may update and control the contents in the control information storage portion 105 based on the monitor result from the input reference optical monitor 113 and the output reference optical monitor 117.

In addition to the above-cited techniques, Patent Reference 2 discloses a technique related to the present invention:

Patent Reference 1: Japanese Laid-open Patent Publication No. 2006-287453
Patent Reference 2: Japanese Laid-open Patent Publication No. 2000-358261
Non-Patent Reference 1: Y. Kai et al., "4×4 high-speed switching subsystem with VOA (<10 μs) using PLZT beam deflector for optical burst switching", Optical Society of America, OFJ7, 2006

However, for optical burst switching frame signal light of the WDM in the manner described above, the input reference optical monitor 113 and the output reference optical monitor 117 are required for each of the input ends and the output ends included in the optical matrix switch 102 for propagating respective reference light, as depicted in FIG. 10 and FIG. 11, as well as the C/L separation coupler 115 and 116 the optical circulators 119a and 119b. Accordingly, since a large number of optical devices are required for propagating reference light on the optical destination paths in the optical matrix switch 102, which may incur increase in the manufacturing cost of the apparatus and complexity of optical wiring.

Neither the above-described Patent References 1 nor 2 provides any structure for simplifying the optical wiring in an optical node apparatus for optical burst switching of frame signal light of the WDM.

SUMMARY

An aspect of the embodiment of the optical node apparatus is as follows:

(1) More specifically, the optical node apparatus of the present invention is characterized in that it includes: pa input-side wavelength mux/demux elements that are capable of receiving wavelength division multiplexed frame signal light input from pa input transmission paths and wavelength division demultiplexing and outputting the signal light, the number pa being one or greater; a switch module including: input ends, the number of the input ends being equal to pa times a maximum accommodating number of the wavelength division multiplexing of the wavelength division multiplexed frame signal light; and output ends, the number of the output ends being equal to pb times the number of the maximum accommodating number of the wavelength division multiplexing, pb being at least two; wherein each frame signal light that is wavelength division demultiplexed by an input-side wavelength mux/demux element is received at a corresponding input end, and each frame signal light that is received at the input end is output from one of the output ends which is related to each wavelength and is coupled to one of the pb output transmission paths, the number pb is at least two; pb output-side wavelength mux/demux elements that are capable of wavelength division multiplexing frame signal light for an output transmission path in the switch module for each of the output transmission paths; a reference light source that monitors and controls the switch module, the reference light source being capable of outputting reference light having a wavelength bandwidth that covers a demultiplexing resolution at the input-side wavelength mux/demux elements and the output-side wavelength mux/demux elements, and each of the pa input-side wavelength mux/demux elements includes at least two first ports and at least two second ports, one of the first ports included in each input-side wavelength mux/demux element is coupled to the input transmission path, the other of the first ports is coupled to the reference light source, and each second port is coupled to each of the input ends of the switch module.

(2) In addition, preferably, each of the pb output-side wavelength mux/demux elements may include at least two first ports and at least two second ports, one of the first ports being coupled to a corresponding one of the output transmission paths, and each second port being coupled to each of the output ends of the switch module; and a first monitor portion that is coupled to the other of the first ports of the pb output-side wavelength mux/demux elements, and monitors reference light that is input from is the reference light source through the switch module.

(3) In this case, there may be provided a second monitor portion, which is provided between the second ports of the pa input-side wavelength mux/demux elements and input ends of the switch module, and monitors wavelength division demultiplexed light of light from the input transmission path, wherein the second monitor portion may monitor reference light that is output from the reference light source and is wavelength division demultiplexed at the input-side wavelength mux/demux elements when light input from the input transmission paths is being waited.

(4) Furthermore, an optical node apparatus of the present invention is characterized in that it includes pa input-side wavelength mux/demux elements that are capable of receiving wavelength division multiplexed frame signal light input from pa input transmission paths and wavelength division demultiplexing and outputting the signal light, the number pa being one or greater; a switch module including: input ends, the number of the input ends being equal to pa times a maximum accommodating number of the wavelength division multiplexing of the wavelength division multiplexed frame signal light; and output ends, the number of the output ends being equal to pb times the number of the maximum accommodating number of the wavelength division multiplexing, pb being at least two; wherein each frame signal light that is wavelength division demultiplexed by an input-side wavelength mux/demux element is received at a corresponding input end, and each frame signal light that is received at the input end is output from one of the output ends which is related to each wavelength and is coupled to one of the pb output transmission paths, the number pb is at least two; pb output-side wavelength mux/demux elements that are capable of wavelength division multiplexing frame signal light for an output transmission path in the switch module for each of the output transmission paths; a reference light source that monitors and controls the switch module, the reference light source being capable of outputting as reference light multi-wavelength light having a wavelength bandwidth that covers a demultiplexing resolution at the input-side wavelength mux/demux elements and the output-side wavelength mux/demux elements, and each of the pb output-side wavelength mux/demux elements includes at least two first ports and at least two second ports, one of the first ports included in each output-side wavelength mux/demux element is coupled to the corresponding output transmission path, the other of the first ports is coupled to the reference light source, and each second port is coupled to each of the output ends of the switch module.

(5) In the optical node apparatus of the above-described (4), each of the pa input-side wavelength mux/demux elements may include at least two first ports and at least two second ports, one of the first ports included in each input-side wavelength mux/demux elements is coupled to the input transmission path, and each second port is coupled to each of the input ends of the switch module, and a first monitor portion that is coupled to the other of the first ports of the pa input-side wavelength mux/demux elements and monitors reference light from the reference light source.

(6) In addition, in the optical node apparatus of the above-described (4), there may be provided a second monitor portion, which is provided between the second ports of the pa input-side wavelength mux/demux elements and input ends of the switch module and monitors wavelength division demultiplexed light of the reference light that is output from the reference light source and is transmitted through the switch module or light from the input transmission path.

(7) Furthermore, in the optical node apparatus of the above-described (1) or (4), the reference light source may output multi-wavelength light in a wavelength band that is substantially comparable to the wavelength band of the frame signal light.

(8) In addition, in the optical node apparatus of the above-described (1) or (4), the reference light source may output multi-wavelength light in a wavelength band that is substantially different from the wavelength band of the frame signal light.

(9) Furthermore, in the optical node apparatus of the above-described (1) or (4), each of the pa input-side wavelength mux/demux elements and the pb output-side wavelength mux/demux elements may be an arrayed-waveguide grating.

(10) In addition, the optical node apparatus of the above-described (2) or (5) may include a control information storage portion that stores control information for establishing light destination paths for propagating frame signal light between the input ends and the output ends in the switch module; a control portion that refers to the control information stored on the control information storage portion and controls switching of the input ends and the output ends in the switch module; and an update control portion that controls to update, on the basis of a monitor result in the monitor portion, the control information stored on the control information storage portion according to combinations of the input ends and the output ends defining the light destination paths that are switchable in the switch module.

(11) Furthermore, in the optical node apparatus of the above-described (10), the switch module may be configured as a deflection light switch that includes a deflection element that deflects input light upon supplying a driving voltage and wherein light destination paths are established between the input ends and the output ends upon the supplying the driving voltage, and the control portion may include: a driving voltage control portion that receives information related to the combinations of the input ends and the output ends to be established as the light destination paths, and outputs a control signal that controls the driving voltage to be supplied to the switch module by referencing to contents stored on the control information storage portion; and a driving voltage supply portion that supplies, to the switch module, the driving voltage controlled by the control signal from the driving voltage control portion, wherein the update control portion controls to update, on the basis of a monitor result from the monitor portion, information that is stored on the control information storage portion as the control information for controlling the driving voltage related to a light destination path to be controlled to update.

(12) Furthermore, in the optical node apparatus of the above-described (11), the light destination path to be controlled to update by the update control portion may be a light destination path that is waiting for being switched between the input transmission path and the output transmission path in the switch module.

(13) Furthermore, in the optical node apparatus of the above-described (1) or (4), the optical node apparatus, wherein the switch module may further includes a wavelength converting portion that carries out wavelength conversion on input light; an output end that directs the switched light to the wavelength converting portion; and an input end that reinputs the light wavelength converted by the wavelength converting portion to the switch module thereby outputting to an output end coupled to one of the output transmission paths.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram illustrating an optical node apparatus according to a first embodiment of the present invention;

Figure 2A:
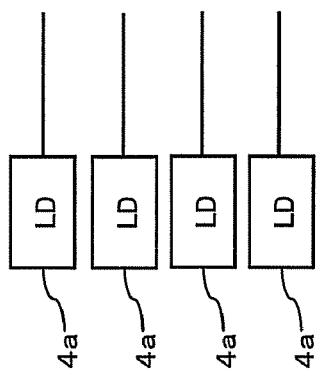
FIGS. 2A-2C are diagrams illustrating an L-band multi-wavelength light source.

DESCRIPTION OF REFERENCE CHARACTERS 1, 101 input-side wavelength mux/demux element
1$a$-1, 1$a$-2, 101$a$, 3$a$-1, 3$a$-2 first port
1$b$-1 through 1$b$-$n$, 101$b$-1 through 101$b$-$n$, 3$b$-1 through 3$b$-$n$ second port
3, 103 output-side wavelength mux/demux element
4, 41-43 L-band multi-wavelength light source
4A C-band multi-wavelength light source
4$a$ LD
4$b$ SLED
4$c$ multimodal filter
4$d$ optical amplifier
5, 5A photo diode
5B optical spectrum analyzer
6 delay portion
7 monitor portion (second monitor portion)
7$a$ reflection mirror
7$b$ photoreceptor element
8 photo coupler
9, 9A, 9B optical spectrum analyzer
9$a$ AWG
9$b$-1 through 9$b$-$n$, 9$d$ photo diode
9$c$ tunable optical filter
10-13, 100, 130 optical node apparatus
21, 23, 25, 26 photo coupler
22, 24 photo diode
102 optical matrix switch (switch module)
102$a$ input end
102$b$ output end
104 driving voltage supply portion
105 control information storage portion
106 driving voltage control portion
109 update control portion
110, 110A wavelength converting portion
111 input signal light monitor
112 light source
113 input reference optical monitor
114 1×N coupler
115, 116 C/L separation coupler
117 output reference optical monitor (photo diode)
118 photo coupler
119$a$, 119$b$ optical circulator
121 input transmission path
122 output transmission path
123, 124 optical amplifier

DESCRIPTION OF EMBODIMENT(S)

Hereinafter, embodiments of the present invention will be described with reference drawings.

Note that the present invention is not limited to the embodiments described below. Moreover, other technique issues and means for solving the technique issues and advantageous effects thereof, in addition to the objects of the above-described present invention, will become apparent with reference to the following disclosure of embodiments.

A. First Embodiment

FIG. 1 is a diagram illustrating an optical node apparatus 10 according to a first embodiment of the present invention. The optical node apparatus 10 depicted in FIG. 1 may be applicable as a WDM switching node having a performance of the response speed of the optical burst switching in the order of microseconds (μs). In addition, the optical node apparatus 10 according to the first embodiment is different from the above-described optical node apparatus 100 depicted in FIG. 10 in terms of the configuration for directing the reference light to the optical matrix switch 102. Note that reference numerals in FIG. 10 refer to the similar elements in FIG. 1.

Here, in the optical node apparatus 10 depicted in FIG. 1, wavelength division multiplexed frame signal light, for example, having the wavelength band in the C-band is entered through multiple (p) input transmission paths 121 while the wavelength division multiplexed frame signal light is output to one of p output transmission paths 122 described above by switching the output destination path for each frame and each wavelength. Note that, in the first embodiment, although the number of input/output transmission paths 121 and 122 are set to the same value of p. However, p (one or more) input transmission path(s) 121 may be used while pb (more than one) output transmission paths 122 may be used.

In addition, in the optical node apparatus 10 of the first embodiment, the wavelength division multiplexed frame signal light from the input transmission paths 121 is wavelength division demultiplexed by an input-side wavelength mux/demux element 1 constructed by an AWG into frame signal light of each channel thereby input into N×N the optical matrix switch 102. In the input-side wavelength mux/demux element 1, L-band multi-wavelength light output from an L-band multi-wavelength light source 4 as a reference light source is also wavelength division demultiplexed by the input-side wavelength mux/demux element 1, thereby input into the optical matrix switch 102 together with the above-described frame signal light.

That is, the L-band multi-wavelength light source 4 is a reference light source for monitoring and managing the optical matrix switch 102, and is configured to output L-band multi-wavelength light that has a wavelength bandwidth covering the demultiplexing resolution at the input-side wavelength mux/demux element 101 as reference light. The L-band multi-wavelength light source 4 may be configured to have one of the structures illustrated in FIGS. 2A through 2C.

Figure 2B:
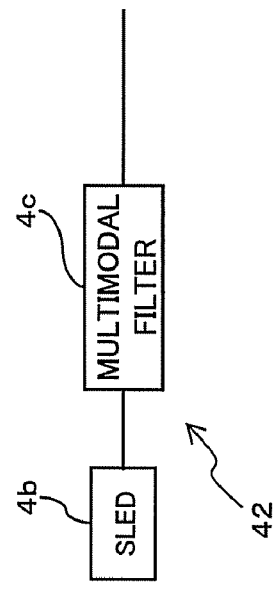
Figure 2C:
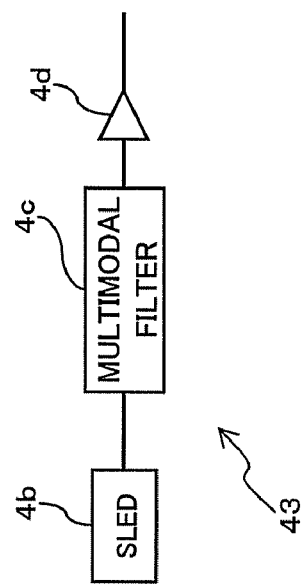

Here, the L-band multi-wavelength light source 41 depicted in FIG. 2A is configured as a laser diode array in which LDs that forms multiple L-band light sources, each having a different light emission wavelength in the L-band, are arranged in an array. In addition, an L-band multi-wavelength light source 42 depicted in FIG. 2B is configured to include a super luminescent light emitting diode (SLED) 4b and a multimodal filter 4c. Furthermore, as an L-band multi-wavelength light source 43 depicted in FIG. 2C, an optical amplifier 4d may be provided after the multimodal filter 4c depicted in FIG. 2B.

Figures 3A, 3B:
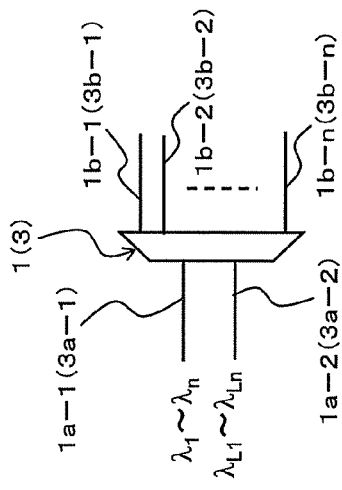
FIG. 3A is a diagram illustrating a wavelength mux/demux element.
FIG. 3B is a diagram illustrating the demultiplexing property of the wavelength mux/demux element.

Furthermore, as depicted in FIG. 3A, for example, each input-side wavelength mux/demux element 1 two first ports 1a-1, 1a-2, and second ports 1b-1 through 1b-n (the number n corresponding to the maximum number of wavelength division multiplexing that can be accommodated). One of the first ports 1a (1a-1) provided to each input-side wavelength mux/demux element 1 is coupled to the input transmission paths 121 while the other of first ports 1a (1a-2) is coupled to the L-band multi-wavelength light source 4. Each of the second ports 1b-1 through 1b-n is coupled to each an input end (input port) 102a of the optical matrix switch 102. Note that two or more first ports 1a may be provided, and that two or more second ports 1b may be provided according to the number of wavelength division multiplexing described above.

Here, the AWGs forming the input-side wavelength mux/demux element 1 are configured to wavelength division demultiplex the light entered from the first port 1a-1 forming the input port into frame signal light of respective channels that are wavelength division multiplexed, and to propagate the light through on respective light propagation paths through each of the second ports 1b-1 through 1b-n forming the output port. In addition, the AWGs are configured to wavelength division demultiplex the reference light entered from the first port 1a-2 at the wavelength interval corresponding to the channel interval, and to propagate the light the second ports 1b-1 through 1b-n together with the frame signal light.

FIG. 3B is a diagram illustrating wavelengths of frame signal light components and reference light component wavelength division demultiplexed light output from the second ports 1b-1 through 1b-n when the wavelength division multiplexed frame signal light input at the first port 1a-1 has wavelengths λ1-λn and the L-band multi-wavelength light at the second port 1a-2 has wavelengths λL1-λLn. As depicted in FIG. 3B, frame signal light λ1-λn and reference light λL1-λLn are output to the second ports 1b-1 through 1b-n.

This enables the frame signal light for switching the destination as well as the reference light for updating the contents in the control information storage portion 105 to be input into each input end 102a of the optical matrix switch 102. In addition, it is possible to associate the channel (wavelength) λi (i=1–n) of each frame signal light for switching the destination with the wavelength λLi of the reference light input into each input end 102a.

Figure 10:
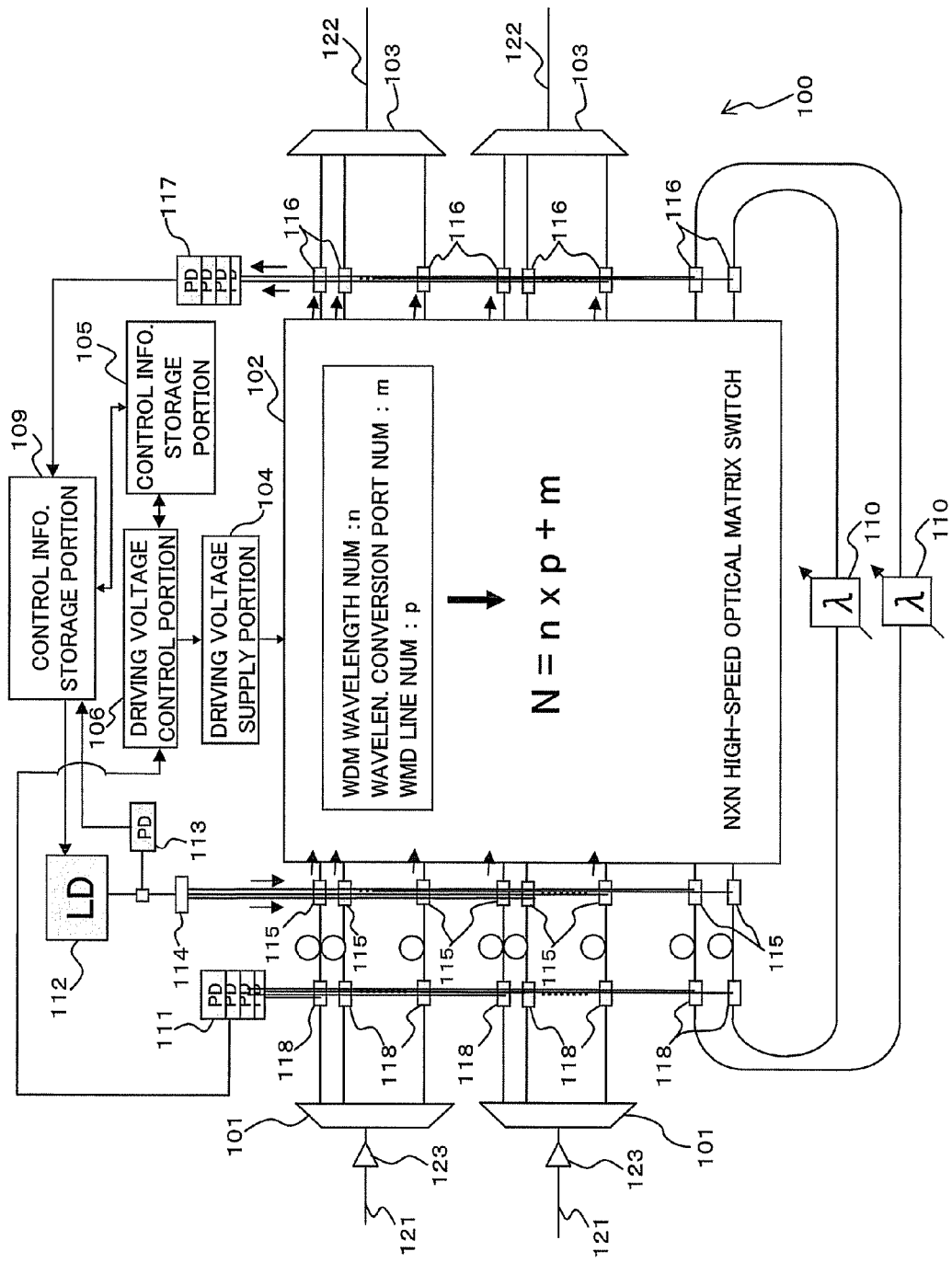
FIG. 10 is a diagram illustrating the problems to be solved by the present invention.

Therefore, unlike the optical node apparatus 100 depicted in FIG. 10 described previously, it is possible to omit (the number of wavelength division multiplexing n× the number of input transmission paths p) C/L separation couplers 115 that are the devices for introducing the L-band multi-wavelength light source 4 into the propagation paths of the frame signal light by coupling the L-band multi-wavelength light source 4 to the inputs of the AWGs forming the input-side wavelength mux/demux element 1 that is previously required for switching the destination of the wavelength division multiplexed light for each wavelength.

The optical matrix switch (switch module) 102 includes, as the one depicted in FIG. 10, m input ends 102a (m is 2 in FIG. 1) for introducing respective frame signal light of wavelength division multiplexed frame signal light for each channel from the p input transmission paths 121, and m output ends 102b (output ports) for directing the frame signal light input from each input end 102a to one of p output transmission paths 122 for each channel for each frame and furthermore, wavelength conversion.

The optical matrix switch 102 is configured to include a light deflection element for deflecting the input light by supplying a driving voltage. Therefore, the optical matrix switch 102 is a deflection light switch in which light destination path is established between an input end 102a and an output end 102b by supplying a driving voltage to the light deflection element from the driving voltage supply portion 104.

More specifically, as described previously, the frame signal light and the reference light introduced to each input end 102a is appropriately deflected by light deflection element in the optical matrix switch 102 by supplying a driving voltage from the driving voltage supply portion 104 from the optical matrix switch 102, and is output from an output end 102b coupled to one output transmission paths 122. In other words, each frame signal light and reference light that is wavelength division demultiplexed at the input-side wavelength mux/demux element 1 is input from a corresponding input end 102a, and the frame signal light and reference light input from the input end 102a is switched and output from one of pb corresponding output ends 102b relating to the wavelength which is coupled to output transmission paths 122.

Note that, similar to the one depicted in FIG. 10, a control information storage portion 105 stores information on the driving voltage to be provided at the above-described driving voltage supply portion 104 according to the optical destination path to be set-up. A driving voltage control portion 106 outputs a control signal to the driving voltage supply portion 104 for controlling the driving voltage to be provided to the light deflection elements forming the optical matrix switch 102 by looking up the contents on the control information storage portion 105 according to the optical destination path to be set-up.

The driving voltage supply portion 104 may supply a driving voltage that is controlled with a control signal from the driving voltage control portion 106 to the optical matrix switch 102. Accordingly, the above-described driving voltage control portion 106 and the driving voltage supply portion 104 form a control portion that looks up control information stored in the control information storage portion 105, and controls the optical matrix switch 102 for switching between an input end 102a and an output end 102b in the optical matrix switch 102.

In addition, reference numeral 5 refers to photo diodes (PDs) that are provided between the second ports 1b-1 through 1b-n of each input-side wavelength mux/demux element 1 and an input end 102a of the optical matrix switch 102 through the photo coupler 118 as a second monitor portion for monitoring wavelength division demultiplexed light from the L-band multi-wavelength light source 4 or the input transmission paths 121, i.e., each light wavelength division demultiplexed by the input-side wavelength mux/demux element 1.

More specifically, the level of frame signal light of each channel that is wavelength division demultiplexed at the input-side wavelength mux/demux element 101 is monitored by the photo diode 5 formed by a photo diode via the photo coupler 118. A target attenuation additional amount is derived at the driving voltage control portion 106 by subtracting the inherent loss at the optical matrix switch 102 and the wavelength division multiplexing portion 103 from the monitor result. The driving voltage information for achieving the target attenuation additional amount value is obtained from the control information storage portion 105, and provided to the driving voltage supply portion 104 as a control signal. Thereby, equalization of the level of light output from each output end through destination path switching processing is achieved.

Here, with regard to a photo diode 5 that is provided on a light propagation path through which frame signal light is input into the optical matrix switch 102, as described previously, such a photo diode 5 functions as an input signal light monitor that monitors the power of the wavelength division demultiplexed light of the frame signal light input transmission paths 121 and provides the monitor result to the driving voltage control portion 106. On the other hands, with regard to a photo diode 5 that is provided on a light propagation path waiting for setting of the light destination path to which no frame signal light is entered, as described previously, such a photo diode 5 functions as an input reference optical monitor that monitors the power of the wavelength division demultiplexed light of the reference light from the L-band multi-wavelength reference light source 4, and provides the monitor result to the update control portion 109.

That is, the output power of the L-band multi-wavelength light source 4 is selected so that the frame signal light and the reference light that is wavelength division demultiplexed and output at the input-side wavelength mux/demux element 1 have different powers (for example, the frame signal light is about +0d Bm while the reference light is about −15d Bm). Thereby, the common photo diode 5 monitors both frame signal light and reference light, and functions as an input signal light monitor when frame signal light is input while functioning as an input reference optical monitor when input of frame signal light from an input transmission path 121 is halted. Note that any photo diode 5 that has a photo-receiving sensitivity having a dynamic range being capable of monitoring light having different power as described previously.

Note that the above-described term "input waiting state of frame signal light from input transmission paths 121" refers to any light destination path that is not setup within the optical matrix switch 102 for propagating frame signal light through controlling the supply of the driving voltage from the above-described driving voltage control portion 106 and the driving voltage supply portion 104 to the optical matrix switch 102.

In addition, a "light destination path" refers to a path formed between a pair of an input end and an output end in the optical matrix switch 102 in response to a driving voltage. In addition, in the driving voltage control portion 106, multiple light destination paths may be established and managed individually in the optical matrix switch 102, and any light destination path in an input waiting state may be individually managed.

In addition, the light output from the output ends 102b of the optical matrix switch 102 is wavelength division multiplexed at an output-side wavelength mux/demux element 3 that is formed from AWGs or the like before the light is entered into the output transmission paths 122. That is, an output-side wavelength mux/demux element 3 is provided each output transmission path 122 that is coupled, and frame signal light that is related to an output transmission paths 122 at the optical matrix switch 102 is output by wavelength division multiplexed for each related output transmission path 122.

Here, the output-side wavelength mux/demux element 3 includes, as depicted in FIG. 3A, two first ports 3a and second ports 3b-1 through 3b-n corresponding to the number of wavelength division multiplexing. Then, n second ports 3b-1 through 3b-n are output to each of the output ends 102b of the optical matrix switch 102, and one of the first ports 3a-1 and 3a-2 (first port 3a-1) is coupled to a corresponding output transmission path 122 while the other first port 3a-2 is coupled to an optical spectrum analyzer 9 as a first monitor portion via a photo coupler 8.

In this case, the input/output wavelength placement of the second and first ports 3b-1 through 3b-n, and 3a-1, 3a-2 in the output-side wavelength mux/demux element 3 is the opposite with respect to the input/output wavelength placement of the first and second ports 1a-1, 1a-2, and 1b-1 through 1b-n in the input-side wavelength mux/demux element 1 depicted in FIG. 3B. Accordingly, when frame signal light in wavelengths $\lambda 1$-$\lambda n$ together with reference light in wavelength $\lambda L1$-$\lambda Ln$ is input into the second ports 3b-1 through 3b-n from the output end 102b of the optical matrix switch 102, the wavelength division multiplexed light of the frame signal light (multiplexed light in wavelengths $\lambda 1$-$\lambda n$) is output to the first port 3a-1 of the output-side wavelength mux/demux element 3 and the wavelength division multiplexed light of the reference light (multiplexed light in wavelengths $\lambda L1$-$\lambda Ln$) is output to the second port 3a-2.

Thereby, the wavelength division multiplexed light of the frame signal light output from the first port 3a-1 is directed into the output transmission paths 122 while the wavelength division multiplexed light of the reference light output from the second port 3a-2 is output to the optical spectrum analyzer 9 via the photo coupler 8. In other words, it is possible to separate between the frame signal light and the reference light at the output-side wavelength mux/demux element 3.

Consequently, compared to the optical node apparatus 100 that is depicted in FIG. 10 and described previously, the AWGs included in wavelength division demultiplexing portion 3 that are previously required for destination path switching of wavelength division multiplexed light for each wavelength can separate wavelength division multiplexed light into the reference light and the frame signal light. Thus, (the number of wavelength division multiplexing n× the number of output transmission path p) of C/L separation couplers 116 can be eliminated which are light elements for directing the reference light included in the output of the optical matrix switch 102 to the output reference optical monitor 117.

The optical spectrum analyzer 9 that functions as a first monitor portion is configured to receive reference light from the first ports 3a-2 included in the output-side wavelength mux/demux element 3 via the photo coupler 8, and to monitor the power of the input reference light for each wavelength component. The optical spectrum analyzer 9 functions as an output reference optical monitor that monitors reference light input from the L-band multi-wavelength light source 4 through the optical matrix switch 102. As the optical spectrum analyzer 9, for example, the simplified configuration as depicted in FIG. 4A or FIG. 4B may be employed.

Figure 4A:
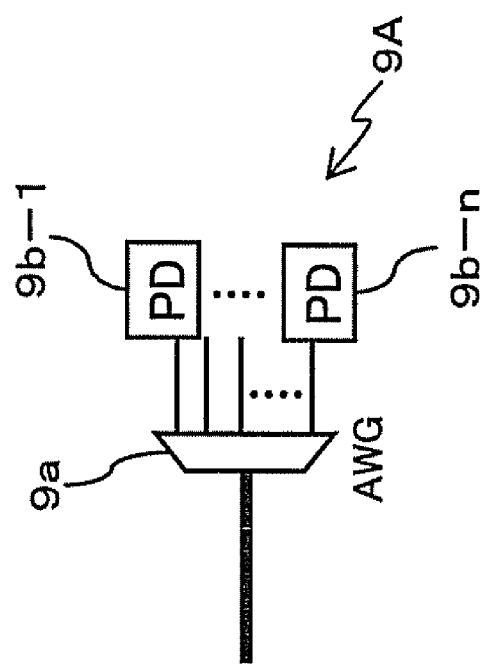
FIGS. 4A and 4B are diagrams illustrating an optical spectrum analyzer.
Figure 4B:
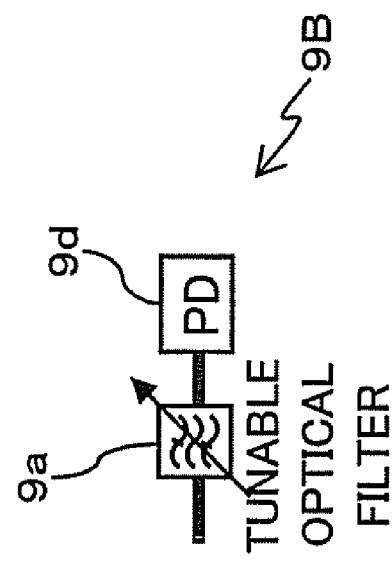

The optical spectrum analyzer 9A depicted in FIG. 4A is configured to includes an AWG 9a that wavelength division demultiplexes input reference light to each light destination path included in the optical matrix switch 102 for wavelengths λL1-λLn, and photo diodes 9b-1 through 9b-n that monitor the power of each reference light component that is reference light component at the AWG 9a wavelength division demultiplexed. In addition, the optical spectrum analyzer 9B depicted in FIG. 4B includes a tunable optical filter 9c that can set the transmittance wavelength to any of wavelengths λL1-λLn, and a photo diode 9d that monitors the power of the reference light component transmitted through the tunable optical filter 9c.

The update control portion 109 is configured to receive the monitor result the optical spectrum analyzer 9 as an output reference optical monitor as configured above and the monitor result from the photo diode 5 as an input reference optical monitor described above, and to control the storage and update of the information stored in the above-described control information storage portion 105 in response to the drive current information.

Note that the update control portion 109 in the first embodiment can switch between light destination paths the driving voltage information of which is to be updated for each input transmission path 121 for each light destination path. Specifically, one of the L-band multi-wavelength light sources 4 provided corresponding to the input transmission paths 121 is put in an activated (turned-on) state while the other L-band multi-wavelength light source 4 is put in an inactive (turned-off) state. Thereby, the reference light propagating through the light destination path in the waiting state that is formed by the input end to which reference light in the above-identified operating state is introduced and the output port, it is possible to monitor the input/output power of the reference light by the photo diode 5 and the optical spectrum analyzer 9 for each reference light wavelength component (or for each light destination path). Then the update control portion 109 may update driving voltage information for each light destination path.

Note that when wavelength conversion is executed on frame signal light from the input transmission paths 121, a light destination path from the corresponding input end 102a to the output end 102b to the wavelength converting portion 110 is established in the optical matrix switch 102. In this case, it is possible to execute update control on the driving voltage information for the light destination path between the input ends to the above-described input transmission paths 121 of the optical matrix switch 102 and the output end 102b to the wavelength converting portion 110.

For this purpose, a C/L separation coupler 116 that separates between L-band light that is reference light and C-band light that is frame signal light is inserted between the output end 102b of the optical matrix switch 102 (for wavelength conversion) and the wavelength converting portion 110. The L-band light that is the reference light separated by the C/L separation coupler 116 is input to the optical spectrum analyzer 9 via the photo coupler 8. Thereby, in the update control portion 109, at the above-described setting waiting state of the light destination path, light power monitor result of the input reference light is received from the photo diode 5 while light power monitor result of the output reference light is received from the optical spectrum analyzer 9 for updating driving voltage information.

Similarly, for carrying out light destination path switching for directing the frame signal light that is undertaken the wavelength conversion at the wavelength converting portion 110 to the output transmission paths 122, a light destination path is established between the input end 102a for reinputting into the optical matrix switch 102 and the output end 102b that is led to the output transmission paths 122. In the optical node apparatus 10 of the first embodiment, it is possible to update and control driving voltage information on the above-described light destination path.

That is, at the previous stage to which light is reinput from the above-described input end 102a, the reference light from the L-band multi-wavelength light source 4 is merged into frame signal light through the C/L separation coupler 115. In addition, in order to monitor the input reference light power from the L-band multi-wavelength light source 4, the photo coupler 118 and the photo diode 5 are inserted between the C/L separation coupler 115 and the input end 102a. Thereby, in the update control portion 109, the light power monitor result of input reference light is received at the photo diode 5 whereas the light power monitor result of the output reference light is received from the optical spectrum analyzer 9, thereby updating the driving voltage information.

Note that in order to prevent a portion of the L-band multi-wavelength light from the input end 102a to be sent into the output transmission paths 122 through the output end 102b and the output-side wavelength mux/demux element 3, only the L-band light having an appropriate wavelength may be emitted from the L-band multi-wavelength light source 41 depicted in FIG. 2A, for example, under the control of the update control portion 109. In addition, the L-band light propagating through the output transmission paths 122 may be interrupted by placing the C/L separation coupler 116 on the output transmission paths 122 in one of the L-band multi-wavelength light sources 41-43 depicted in FIGS. 2A to 2C.

In the optical node apparatus 10 configured as described above, when wavelength division multiplexed frame signal light is input from the input transmission paths 121, a light destination path that is led to an output transmission path 122 to which the input frame signal light is to be output is established under a driving voltage control through the driving voltage supply portion 104 at the driving voltage control portion 106 against the optical matrix switch 102. Thereby, switching of light destination paths is carried out for each frame signal light and for each wavelength. In addition, such a switching is carried out for variable attenuation control based on the frame signal light power monitored at the photo diode 5.

Note that in the driving voltage control portion 106, when an input of frame signal light is detected based on the monitor result from the photo diode 5, destination path setting control is carried out at the optical matrix switch 102 corresponding to the frame signal light. A delay portion 6 delays input of frame signal light into an input end of the optical matrix switch 102 until frame signal light input is detected at the above-described photo diode 5 and destination path setting control is completed.

The update control portion 109 updates driving voltage information (information for variable attenuation control) for establishing a light destination path in a setting waiting state at the optical matrix switch 102. For this purpose, input reference light power is monitored at a photo diode 5 that is coupled to an input end on that light propagation path, and reference light power output from a corresponding output end is monitored by the optical spectrum analyzer 9.

Therefore, it is possible to omit (the number of wavelength division multiplexing n× the number of input transmission paths p) C/L separation couplers 115 that are the devices for introducing the L-band multi-wavelength light source 4 into the propagation paths of the frame signal light by coupling the L-band multi-wavelength light source 4, which is included in the optical node apparatus 100 depicted in FIG. 10 described previously, to the inputs of the AWGs forming the input-side wavelength mux/demux element 1 that is previously required for switching the destination of the wavelength division multiplexing light for each wavelength.

In addition, the AWGs included in wavelength division demultiplexing portion 3 that are previously required for destination path switching of wavelength division multiplexed light for each wavelength can separate wavelength division multiplexed light into the reference light and the frame signal light. Thus, n×p (n is the number of wavelength division multiplexing and p is the number of output transmission path) of C/L separation couplers 116, which are included in the optical node apparatus 100 in FIG. 10 can be eliminated. The n×p of C/L separation couplers 116 are light elements for directing the reference light included in the output of the optical matrix switch 102 to the output reference optical monitor 117.

As described above, the number of the optical devices used can be reduced by the inclusion of the L-band multi-wavelength light source 4, the input-side wavelength mux/demux element 1 and the output-side wavelength mux/demux element 3 according to the first embodiment of the present invention, which is advantageous in that the optical wiring can be simplified, manufacturing steps can be reduced, and the manufacturing cost of the apparatus can be reduced.

(A1) Variation of First Embodiment

Figure 5:
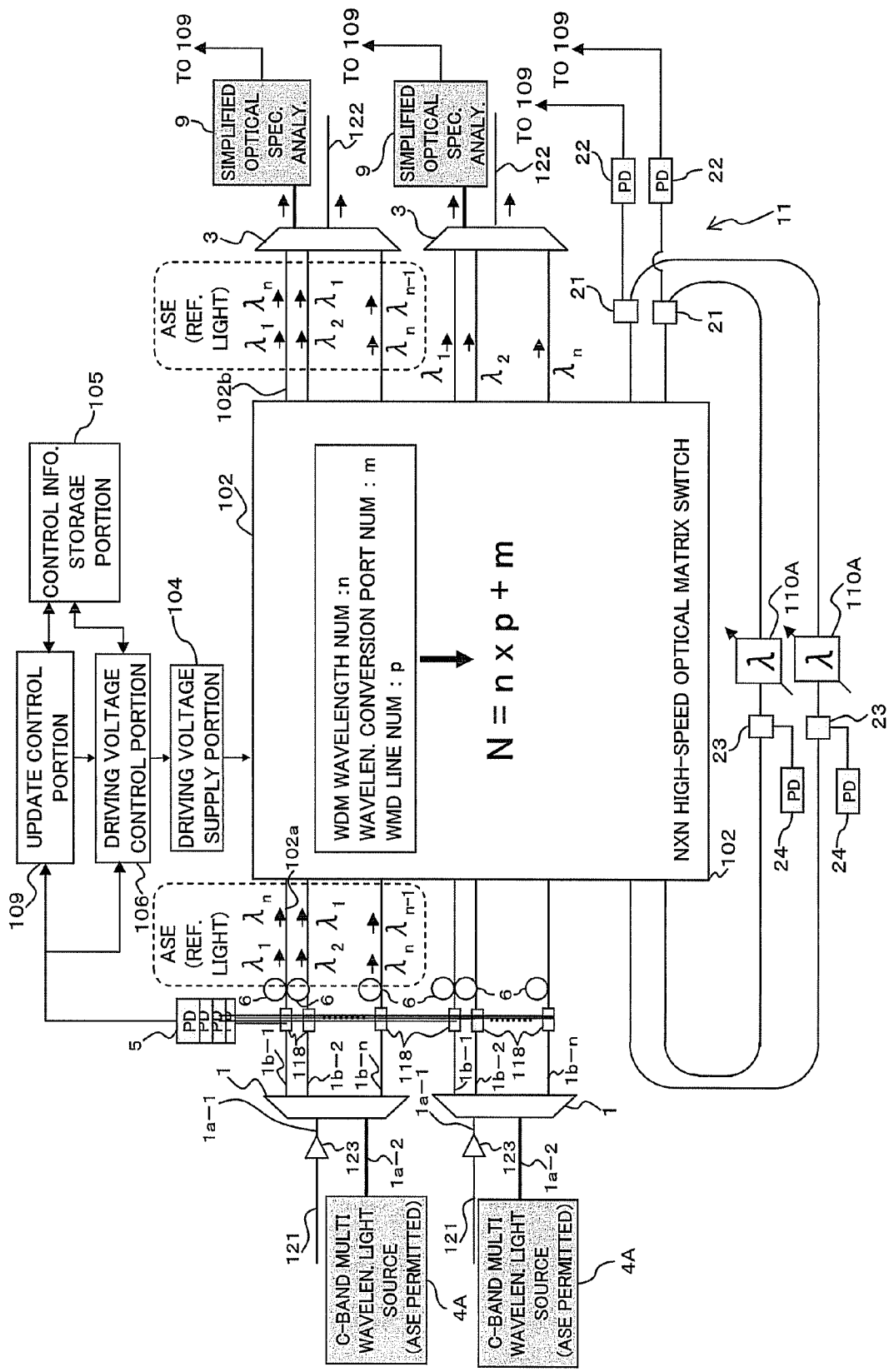
FIG. 5 is a diagram illustrating an optical node apparatus according to a variation of the first embodiment
Figures 6A, 6B:
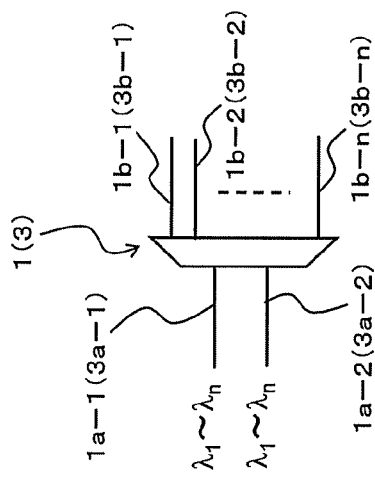
FIG. 6A is a diagram illustrating a wavelength mux/demux element.
FIG. 6B is a diagram illustrating the demultiplexing property of the wavelength mux/demux element.

FIG. 5 is a diagram illustrating an optical node apparatus 11 according to a variation of the first embodiment of the present invention. The optical node apparatus 11 depicted in FIG. 1 is different from the one depicted in FIG. 1, wherein as depicted in FIG. 5 and FIG. 6A, for example, a C-band multi-wavelength light source 4A is input to the first port 1a-2 of the AWGs forming the input-side wavelength mux/demux element 1 as a reference light source that outputs multi-wavelength light having wavelength band $\lambda 1$-$\lambda n$ that is substantially comparable to the wavelength band of frame signal light. Note that the C-band multi-wavelength light source 4A may be configured as one of reference numerals 41-43 depicted in FIGS. 2A to 2C, or a light element that emits amplified spontaneous emission (ASE) light may be used.

Here, since frame signal light and reference light having the substantially comparable wavelength band $\lambda 1$-$\lambda n$ are input into the input-side wavelength mux/demux element 1 but they are input to different first ports 1a-1, 1a-2 included in the input-side wavelength mux/demux element 1, it is possible to avoid the wavelength components of the frame signal light and the reference light from overlapping each other for wavelength division demultiplexed light output from the second ports 1b-1 through 1b-n. Thereby, coherent crosstalk of frame signal light due to an input of reference light can be prevented.

Specifically, FIG. 6B is a diagram illustrating wavelengths of frame signal light components and reference light component wavelength division demultiplexed light output from the second ports 1b-1 to 1b-n when the wavelength division multiplexed frame signal light input at the first port 1a-1 has wavelengths $\lambda 1$-$\lambda n$ and the C-band multi-wavelength light forming the reference light received at the second port 1a-2 has wavelengths $\lambda L1$-$\lambda Ln$. As depicted in FIG. 6B, wavelength components $\lambda 1$-$\lambda n$ are output at the second ports 1b-1 through 1b-n as frame signal light components while wavelength components $\lambda 2$-$\lambda n-1$, and $\lambda 1$ are output as reference light components.

This enables the frame signal light for switching the destination as well as the reference light for updating the content in the control information storage portion 105 to be input into each input end 102a of the optical matrix switch 102. In addition, it is possible to associate the channel (wavelength) $\lambda 1$ through $\lambda n$ of each frame signal light for switching the destination with the wavelength $\lambda 2$ through $\lambda n$, $\lambda 1$ of the reference light input into each input end 102a.

Accordingly, in this case, it is possible to omit (the number of wavelength division multiplexing n× the number of input transmission paths p) C/L separation couplers 115 that are the devices for introducing the L-band multi-wavelength light source 4A into the propagation paths of the frame signal light by coupling the C-band multi-wavelength light source 112, which is required in the case of FIG. 10 described previously, to the inputs of the AWGs forming the input-side wavelength mux/demux element 1 that is previously required for switching the destination of the wavelength division multiplexing light for each wavelength.

In addition, the input/output wavelength placement of the second and first ports 3b-1 through 3b-n, and 3a-1, 3a-2 in the output-side wavelength mux/demux element 3 is the opposite with respect to the input/output wavelength placement of the first and second ports 1a-1, 1a-2, and 1b-1 through 1b-n in the input-side wavelength mux/demux element 1 depicted in FIG. 6B. Accordingly, when frame signal light in wavelengths $\lambda 1$-$\lambda n$ together with reference light in wavelength $\lambda 2$-$\lambda n-1$, $\lambda 1$ is input into the second ports 3b-1 through 3b-n from the output end 102b of the optical matrix switch 102, the wavelength division multiplexed light of the frame signal light (multiplexed light in wavelengths $\lambda 1$-$\lambda n$) is output to the first port 3a-1 of the output-side wavelength mux/demux element 3 and the wavelength division multiplexed light of the reference light (multiplexed light in wavelengths $\lambda 1$-$\lambda n$) is output to the second port 3a-2.

Thereby, the wavelength division multiplexed light of the frame signal light output from the first port 3a-1 is directed into the output transmission paths 122 while the wavelength division multiplexed light of the reference light output from the second port 3a-2 is output to the optical spectrum analyzer 9 via the photo coupler 8. In other words, it is possible to separate between the frame signal light and the reference light at the output-side wavelength mux/demux element 3.

Accordingly, the AWGs included in wavelength division demultiplexing portion 3 that are previously required for destination path switching of wavelength division multiplexed light for each wavelength can separate wavelength division multiplexed light into the reference light and the frame signal light. Thus, n×p (n is the number of wavelength division multiplexing and p is the number of output transmission path) of C/L separation couplers 116 can be eliminated. The n×p of C/L separation couplers 116 are required in the case of FIG. 10 and are light elements for directing the reference light included in the output of the optical matrix switch 102 to the output reference optical monitor 117.

Note that when wavelength conversion is executed on frame signal light from the input transmission paths 121, a light destination path from the input end 102a to the output end 102b to the wavelength converting portion 110A is established in the optical matrix switch 102. When such a light destination path for wavelength conversion is in a setting waiting state, it is possible to carry out update control of the driving voltage information regarding a light destination path between an input end to which frame signal light to wavelength conversed at the optical matrix switch 102 is input and an output end 102b that is lead to the wavelength converting portion 110A.

For this purpose, a photo coupler 21 and a photo diode 22 for monitoring the power of the C-band light that is reference light are provided between the output end 102b of the optical matrix switch 102 (for wavelength conversion) and the wavelength converting portion 110A. Thereby, the update control portion 109 can update the driving voltage information by receiving the monitor result of the light power of the output reference light that is output through the light destination path to be updated, and by receiving the monitor result of the input reference light from the photo diode 5 on a corresponding input end on the light propagation path when inputting into the light destination path to be updated.

In addition, for carrying out light destination path switching for directing the frame signal light that is undertaken the wavelength conversion at the wavelength converting portion 110A to the output transmission paths 122 to be output, a light destination path is established between the input end 102a for reinputting into the optical matrix switch 102 and the output end 102b that is led to the output transmission paths 122. In the optical node apparatus 11 depicted in FIG. 5, when the light destination path for wavelength conversion is in a setting waiting state, the driving voltage information of the light destination path that is established in this manner can be update controlled.

For this purpose, the wavelength converting portion 110A is configured to emit C-band light as reference light under the control of the update control portion 109. In addition, the wavelength converting portion 110A includes a photo coupler 23 and a photo diode 24 for monitoring the power of the emitted light as input reference light power. Thereby, the update control portion 109 can update the driving voltage information by receiving the monitor result of the light power of the input reference light that is reinput into the optical matrix switch 102 from the photo diode 24 while receiving the monitor result of the output reference light power that is output through the light destination path to be updated from the optical spectrum analyzer 9.

Accordingly, the optical node apparatus 11 depicted in FIG. 5 can provide advantages similar to those of the above-identified first embodiment.

(B) Second Embodiment

Figure 7:
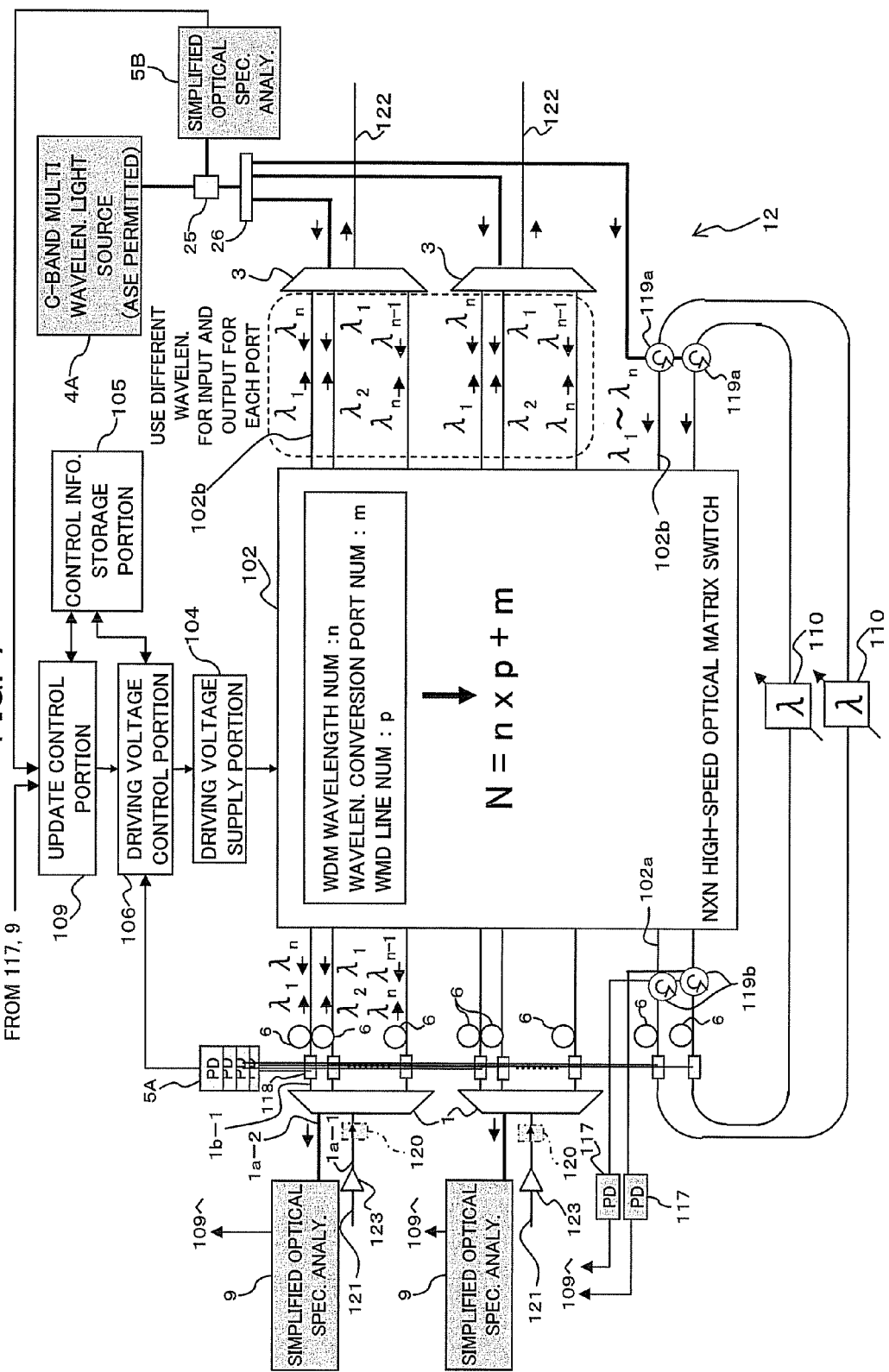
FIG. 7 is a diagram illustrating an optical node apparatus according to a second embodiment.

FIG. 7 is a diagram illustrating an optical node apparatus 12 according to a second embodiment of the present invention. Unlike the above-descried embodiment depicted in FIG. 1, an optical node apparatus 12 depicted in FIG. 7 includes an optical spectrum analyzer 9 that receives reference light output from a C-band multi-wavelength light source 4A that is a reference light source on the output-side and monitors the output reference light on the input-side. Note that like reference numerals depicted in FIG. 7 denote substantially similar elements depicted in FIG. 5.

Here, one port 3a-1 of first ports 3a-1 and 3a-2 of each of p output-side wavelength mux/demux elements 3 is coupled to a corresponding output transmission path 122 while the other port 3a-2 of the first ports 3a-1 and 3a-2 is coupled to a C-band multi-wavelength light source 4A via couplers 25 and 26, and second ports 3b-1 through 3b-n are coupled to output ends of the optical matrix switch 102.

Thereby, the frame signal light output from the output end 102b of the optical matrix switch 102 is wavelength division multiplexed at the output-side wavelength mux/demux element 3 and output to a transmission paths 122 through the first port 3a-1. On the other hand, the reference light from the C-band multi-wavelength light source 4A is wavelength division demultiplexed by the output-side wavelength mux/demux element 3 is output to an output end 102b of the optical matrix switch 102 through the second ports 3b-1 through 3b-n.

Here, the photo coupler 25 demultiplexed portion of the reference light that is output from the C-band multi-wavelength light source 4A and is output to the photo coupler 26 and output the light to an optical spectrum analyzer 5B. In addition, the optical spectrum analyzer 5B monitors the power of each wavelength component of the reference light in at C-band multi-wavelength, and is configured according to the configurations in FIG. 4A or FIG. 4B.

In other words, the optical spectrum analyzer 5B is a second monitor portion that monitors the light from the C-band multi-wavelength light source 4A between the C-band multi-wavelength light source 4A and the photo coupler 26, and has a function as an input reference optical monitor monitoring the light power at the stage prior to input of the reference light into the optical matrix switch 102.

In addition, the photo coupler 26 is configured to split the reference light input from the C-band multi-wavelength light source 4A via the photo coupler 25 into the number equal to the number of the output-side wavelength mux/demux elements 3 and output to the first port 3a-2. That is, the photo coupler 26 is a splitting portion that splits the reference light from the C-band multi-wavelength light source 4A into pb (p, in this case), and the split optical paths split by the photo coupler 26 are coupled to the other port 3a-2 of the first ports 3a-1 and 3a-2 included in each of the output-side wavelength mux/demux elements 3.

Note that the relationship between the wavelengths of the wavelength division demultiplexed light and each of the second ports 3b-1 through 3b-n for the light received from the first ports 3a-2 of the output-side wavelength mux/demux elements 3 are similar to the above-described aspect depicted in FIG. 6B except that the input and the output are reversed. Accordingly, the reference light input from the first port 3a-2 of each of the output-side wavelength mux/demux elements 3 is wavelength division demultiplexed, and the light having wavelengths of $\lambda 2$-$\lambda n-1$, $\lambda 1$ is output to the output end side of the optical matrix switch 102 from the second ports 3b-1 through 3b-n.

In addition, the one ports 1a-1 of the first ports 1a-1 and 1a-2 of the p input-side wavelength mux/demux elements 1 are coupled to the input transmission paths 121, and the other ports 1a-2 are coupled to the optical spectrum analyzers 9. The optical spectrum analyzers 9 are a first monitor portion that is configured to receive the reference light the C-band multi-wavelength light source 4A as a reference light source through the photo couplers 25 and 26, the output-side wavelength mux/demux elements 3, the optical matrix switch 102 and the input-side wavelength mux/demux elements 1, monitor the reference light from the C-band multi-wavelength light source 4A, and output the monitor result to the update control portion 109. In other words, the optical spectrum analyzers 9 function as output reference optical monitors that monitor the light power at the stage after the reference light is output from the optical matrix switch 102.

Note that in the second embodiment, optical circulators 119a and 119b and photo diode 117 are provided in order to monitor the input/output power of the reference light to control update of driving voltage information related to the light destination path via the wavelength converting portion 110.

The optical circulator 119a is adapted to output the reference light from the C-band multi-wavelength light source 4A to the input end side via the output end of the optical matrix switch 102. This allows updating the driving voltage information by monitoring the input/output reference light power of the light destination path between an input end 102a that is coupled to the light propagation path propagating the light from the input transmission paths 121, and an output end 102b directing to the wavelength converting portion 110.

Note that in order to prevent part of the C-band multi-wavelength light to the input end 102a for wavelength conversion crosstalk in the input transmission path 121 in the direction opposite to the propagation direction of the frame signal light, a light isolator 120 may be interposed between an optical amplifier 123 for loss compensation and the input-side wavelength mux/demux elements 1. However, when the optical amplifier 123 has the function similar to that of the light isolator 120, the crosstalk may be prevented in the similar manner.

In addition, the photo diode 117 is adapted to receive and monitor, for the light destination path between an input end 102a to which light is reinput from the wavelength converting portion 110 and an output end 102b directing the light to the output transmission path 122, the reference light propagated from the output end 102b side to the input end 102a side through the optical circulator 119b. Thereby, the driving voltage information can be updated by monitoring the input/output reference light power for this light destination path.

Note that reference symbol 5A denotes a photo diode as an input signal light monitor which monitors the light power of the frame signal light that is wavelength division demultiplexed by the input-side wavelength mux/demux elements 1.

In the optical node apparatus 12 according to the second embodiment configured as described above, when wavelength division multiplexed frame signal light is input from the input transmission paths 121, a light destination path that is led to an output transmission path 122 to which the input frame signal light is to be output is established under a driving voltage control through the driving voltage supply portion 104 at the driving voltage control portion 106 against the optical matrix switch 102. Thereby, switching of light destination paths is carried out for each frame signal light and for each wavelength. In addition, such a switching is carried out for variable attenuation control based on the frame signal light power monitored at the photo diode 5A.

Note that in the driving voltage control portion 106, when an input of frame signal light is detected based on the monitor result from the photo diode 5A, destination path setting control is carried out at the optical matrix switch 102 corresponding to the frame signal light. A delay portion 6 delays input of frame signal light into an input end of the optical matrix switch 102 until frame signal light input is detected at the above-described photo diode 5 and destination path setting control is completed.

The update control portion 109 updates driving voltage information (information for variable attenuation control) for establishing a light destination path in a setting waiting state at the optical matrix switch 102. For this purpose, it directs the reference light from the C-band multi-wavelength light source 4A from the output side of the frame signal light to the input side to monitor the input reference light power at the optical spectrum analyzer 5B, and it monitors the output reference light power at the optical spectrum analyzers 9 that are coupled to the first ports 1a-2 of the input-side light mux/demux elements 1 on the light propagation paths coupled to the input end.

Figure 11:
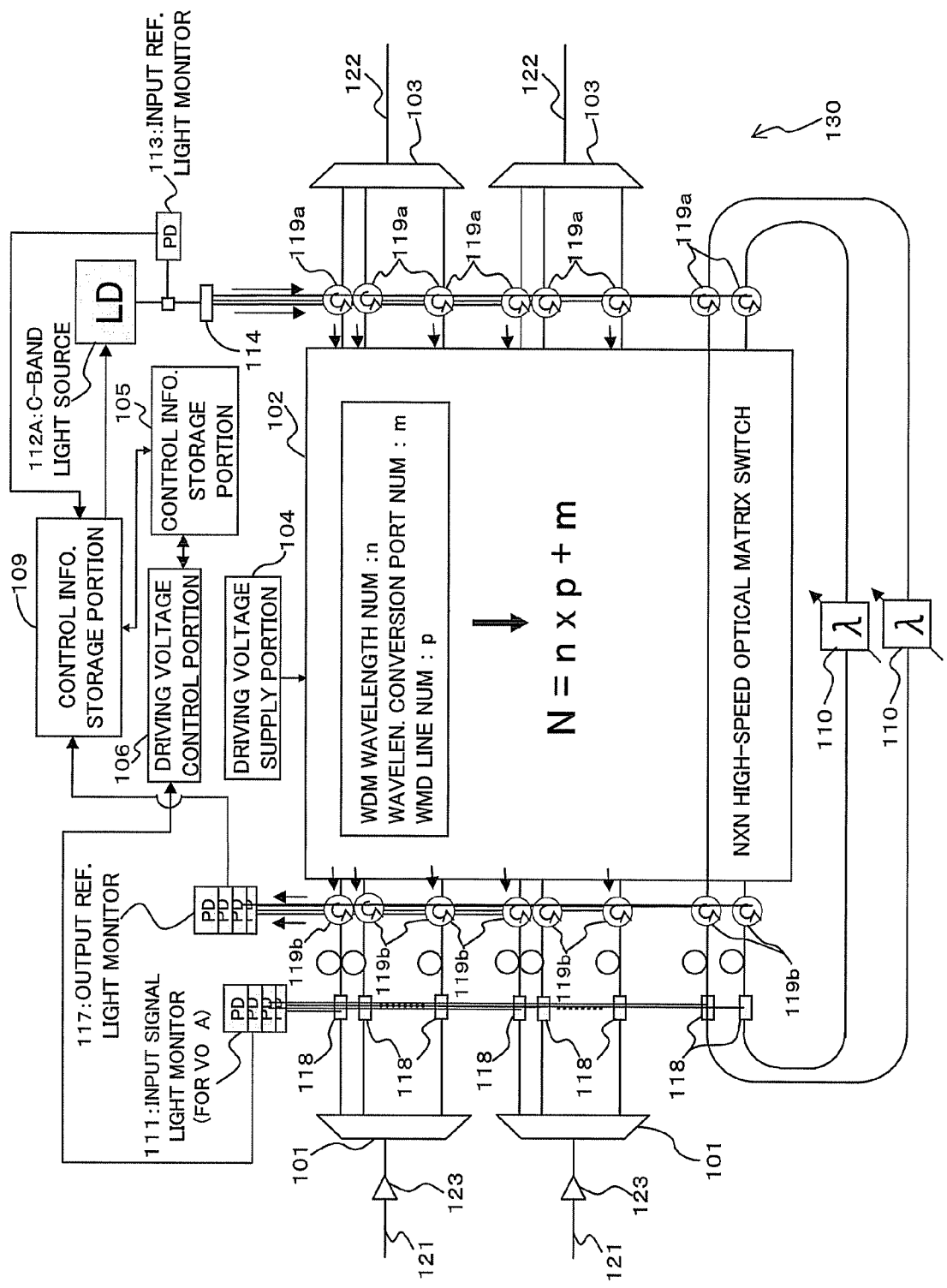
FIG. 11 is a diagram illustrating the problems to be solved by the present invention.

Therefore, it is possible to omit (the number of wavelength division multiplexing n× the number of input transmission paths p) optical circulator 119a that are the devices for introducing the L-band multi-wavelength light source 112 into the propagation paths of the frame signal light by coupling the C-band multi-wavelength light source 4A via the optical couplers 25 and 26, which is included in the optical node apparatus 130 depicted in FIG. 11 described previously, to the first ports 3a-2 of the AWGs forming the output-side wavelength mux/demux element 3 that is previously required for switching the destination of the wavelength division multiplexing light for each wavelength.

In addition, it is possible to couple the optical spectrum analyzers 9 to the first ports 1a-2 of the AWGs forming the input-side wavelength mux/demux elements 1 that are previously required for destination path switching of wavelength division multiplexed light for each wavelength. Thus, (the number of wavelength division multiplexing n× the number of input transmission path p) of the optical circulator 119b, which is included in the optical node apparatus 130 that is depicted in FIG. 11, can be eliminated which are light elements for directing the reference light to the output reference optical monitor 117.

As described above, the number of the optical devices used can be reduced by the inclusion of the C-band multi-wavelength light source 4A, the input-side wavelength mux/demux element 1 and the output-side wavelength mux/demux element 3 according to the second embodiment of the present invention, which is also advantageous in that the optical wiring can be simplified, manufacturing steps can be reduced, and the manufacturing cost of the apparatus can be reduced.

(B1) Variation of Second Embodiment

Figure 8:
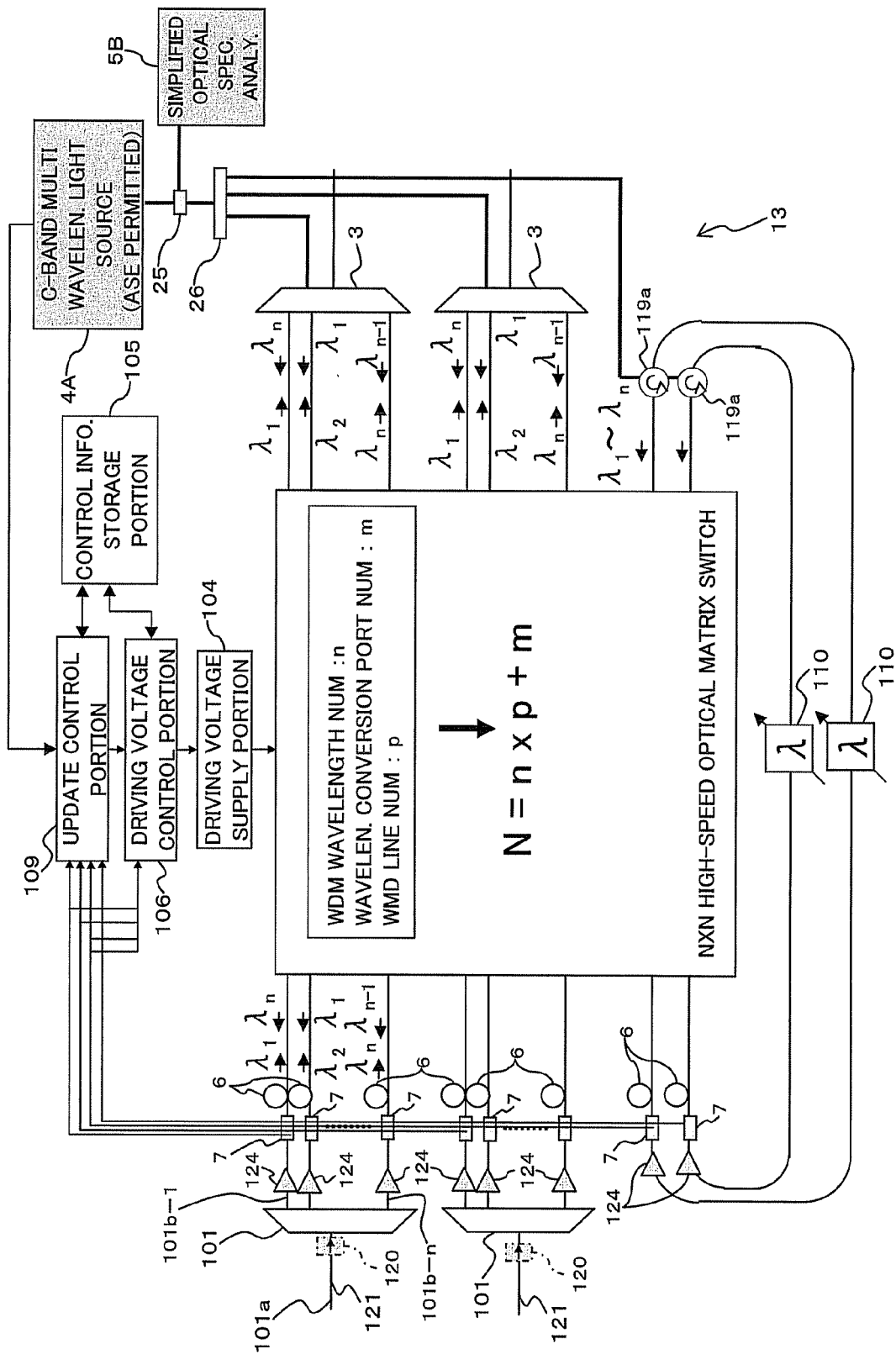
FIG. 8 is a diagram illustrating an optical node apparatus according to a variation of the second embodiment.

FIG. 8 is a diagram illustrating an optical node apparatus 13 according to a variation of the second embodiment of the present invention. The optical node apparatus 13 depicted in FIG. 8 is different from the optical node apparatus 12 depicted in FIG. 7 described previously in terms of the configuration to monitor the reference light transmitted through the optical matrix switch 102. Note that like reference numerals shown in FIG. 8 denote substantially similar elements shown in FIG. 7.

The optical node apparatus 13 depicted in FIG. 8 is configured to monitor the output reference light at the monitor portion 7 that monitors the input signal light, rather than monitoring the output reference light transmitted through the optical matrix switch 102 at the optical spectrum analyzers 9. Note that the input-side wavelength mux/demux elements 101 that wavelength division demultiplex each wavelength division multiplexed frame signal light from the input transmission paths 121 may not have two first ports 1a-1 and 1a-2 as in the case of the above-described embodiments (see reference symbol 1), and may include only first ports 101a that are coupled to the input transmission paths 121 depicted in FIG. 10.

Figure 9:
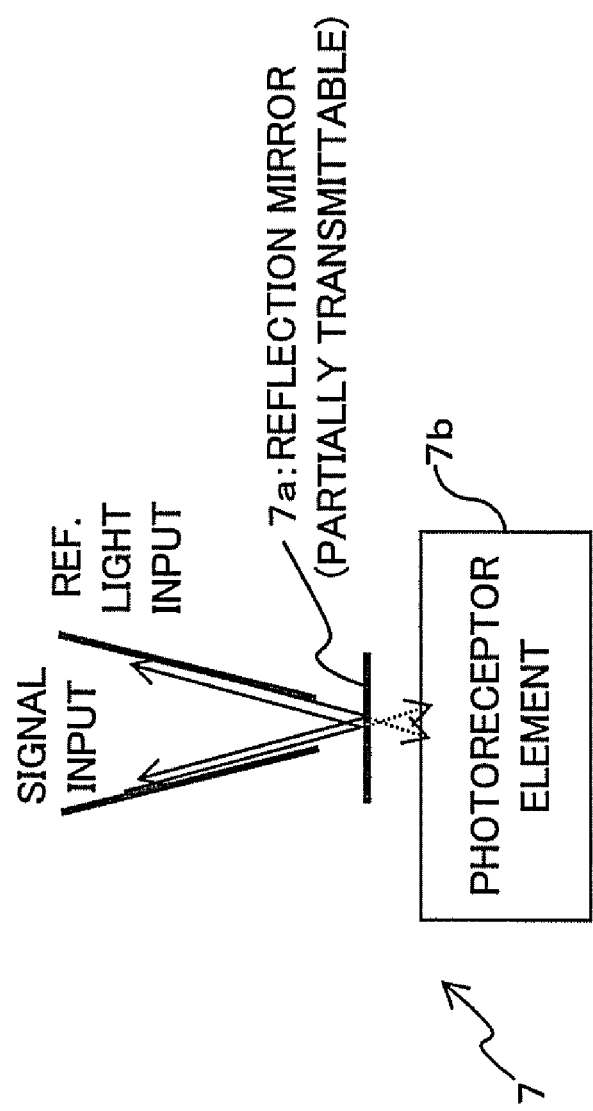
FIG. 9 is a diagram illustrating a monitor portion according to a variation of the second embodiment.

In addition, the monitor portions 7 are provided between wavelength division multiplexing-enabled second ports 101b-1 through 101-n in the input-side wavelength mux/demux elements 101 and corresponding input ends 102a of the corresponding optical matrix switch 102, and are configured to monitor the power of the frame signal light from the side of the input-side wavelength mux/demux elements 101 as well as monitoring the reference light component from the input ends 102a as depicted in FIG. 9, for example.

As depicted in FIG. 9, each monitor portion 7 is configured to include a reflection mirror 7a that reflects part of the incident light and transmits part of the incident light, and a photoreceptor element 7b that receives the light transmitted through the reflection mirror 7a and outputs an electrical signal corresponding to its light power. The reflection mirror 7a is configured to propagate a light propagation path directed to the input end 102a for the reflected light from the side of the input-side wavelength mux/demux element 101, and propagates a light propagation path directed to the input-side wavelength mux/demux element 101 for the reflected light from the input end 102a.

The output power of the C-band multi-wavelength light source 4A is set so that the powers of the frame signal light and the reference light that are wavelength division demultiplexed and output at the input-side wavelength mux/demux element 1 (for example, frame signal light is about +0d Bm and the reference light is about −15d Bm) Therefore, common photoreceptor elements 7 are used for monitoring both the frame signal light and the reference light, wherein photoreceptor elements 7 function as input signal light monitors when frame signal light is input and function as output reference optical monitors when input of the frame signal light is being waited from the input transmission paths 121. Note that any photoreception element 7 that has a photo-receiving sensitivity having a dynamic range being capable of monitoring light having different power as described previously.

Accordingly, the above-described the monitor portions 7 are second monitor portions that are provided between the second ports 101b-1 through 101b-n of the p input-side wavelength mux/demux elements 101 and the input ends 102a of the optical matrix switch 102, and monitor the wavelength division demultiplexed light from the reference light or the input transmission paths 121 that is output from the C-band multi-wavelength light source 4A and propagate through the optical matrix switch 102.

Note that reference symbol 124 is an optical amplifier that amplifies the frame signal light wavelength division demultiplexed at the input-side wavelength mux/demux elements 101. In addition, in order to prevent crosstalk of a part of the C-band multi-wavelength light to the input end 102a coupled to the wavelength converting portion 110 at the input transmission paths 121 in the direction opposite to the propagation direction of the frame signal light, a light isolator 120 may be provided in the input waveguide 121. However, crosstalk can be similarly prevented when the optical amplifier 124 has the similar function as that of the light isolator 120.

Also in the optical node apparatus 13, similar to the case of the second embodiment described above, the C-band multi-wavelength light source 4A is coupled to the first port 3a-2 of the output-side wavelength mux/demux element 3 included in AWG that was required for the destination path switching via the photo couplers 25 and 26 for each wavelength of the wavelength division multiplexed light. Thereby, it is possible to omit (the number of wavelength multiplexing n× the number of input transmission paths p) optical circulators 119a that are the devices for introducing the L-band multi-wavelength light source 112 into the propagation paths of the frame signal light which are previously provided the above-identified optical node apparatus 130 shown in FIG. 11, thereby achieving the same advantages as the second embodiment.

(C) Others

Without being limited to the above-identified embodiments, the present invention may be implemented various manner without departing from the spirit thereof.

For example, in the above-described optical node apparatus 10 depicted in FIG. 1, the power of the reference light output from each of the output-side wavelength mux/demux elements 3 is monitored with a single optical spectrum analyzer 9 via the photo coupler 8. However, according to the present invention, a respective optical spectrum analyzer may be provided for monitoring the power of the reference light output from each of the output-side wavelength mux/demux elements 3. In this case, the L-band multi-wavelength light sources 4 that are respectively coupled to each input-side wavelength mux/demux element 1 may be provided by having a single L-band multi-wavelength light source, and the reference light output from the L-band multi-wavelength light source may be supplied to the first port 1a-2 of the input-side wavelength mux/demux element 1 by branching by a photo coupler. That is, driving voltage information that is generated for each light destination path established in the optical matrix switch 102 may be updated by monitoring the reference light power.

Furthermore, in the optical node apparatus 11 depicted in FIG. 5, the configuration is possible in which either one of the C-band multi-wavelength light source 4A and the optical spectrum analyzer 9 is used while bundling photo couplers, as in the example of the above-described FIG. 1. Also in the optical node apparatus 12 depicted in FIG. 7, each C-band multi-wavelength light source 4A supplying via each output-side wavelength mux/demux element 3 may be provided. In this case, the configuration is possible in which optical spectrum analyzers 9 coupled to each of the input-side wavelength mux/demux elements 1 is bundled using photo couplers or the like, thereby monitoring with a single optical spectrum analyzer.

In addition, although the optical matrix switch 102 is configured as a deflection light switch in each of the above-described embodiment, other light switch configurations may be used.

Furthermore, in each of the above-described embodiments, for the update control at the update control portion 109, the configuration is provided in which the power of the reference lights that is output from the reference light source 4 or 4A and propagated through the optical matrix switch 102, as well as monitoring the power at the previous stage prior to the propagation. By storing the power at the previous stage in the control information storage portion 105 or the like as a known value, the monitoring of the reference light power at the previous stage propagating through the optical matrix switch 102 may be omitted, which allows to execute the update control on driving voltage information in the similar manner.

In addition, the apparatus according to the present invention may be manufactured by those skilled in the art from the above-described disclosure of the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. An optical node apparatus comprising:
   pa input-side wavelength mux/demux elements that are capable of receiving wavelength division multiplexed frame signal light input from pa input transmission paths and wavelength division demultiplexing and outputting the signal light, the number pa being one or greater;

a switch module comprising:

input ends, the number of the input ends being equal to pa times a maximum accommodating number of the wavelength division multiplexing of the wavelength division multiplexed frame signal light; and output ends, the number of the output ends being equal to pb times the number of the maximum accommodating number of the wavelength division multiplexing, pb being at least two;

wherein each frame signal light that is wavelength division demultiplexed by an input-side wavelength mux/demux element is received at a corresponding input end, and each frame signal light that is received at the input end is output from one of the output ends which is related to each wavelength and is coupled to one of the pb output transmission paths, the number pb is at least two;

pb output-side wavelength mux/demux elements that are capable of wavelength division multiplexing frame signal light for an output transmission path in the switch module for each of the output transmission paths;

a reference light source that monitors and controls the switch module, the reference light source being capable of outputting reference light having a wavelength bandwidth that covers a demultiplexing resolution at the input-side wavelength mux/demux elements and the output-side wavelength mux/demux elements, and each of the pa input-side wavelength mux/demux elements comprises at least two first ports and at least two second ports, one of the first ports included in each input-side wavelength mux/demux element is coupled to the input transmission path, the other of the first ports is coupled to the reference light source, and each second port is coupled to each of the input ends of the switch module.

2. The optical node apparatus according to claim 1, wherein each of the pb output-side wavelength mux/demux elements comprises:

at least two first ports and at least two second ports, one of the first ports being coupled to a corresponding one of the output transmission paths, and each second port being coupled to each of the output ends of the switch module; and a first monitor portion that is coupled to the other of the first ports of the pb output-side wavelength mux/demux elements, and monitors reference light that is input from is the reference light source through the switch module.

3. The optical node apparatus according to claim 2, further comprising:

a second monitor portion that is provided between the second ports of the pa input-side wavelength mux/demux elements and input ends of the switch module, and monitors wavelength division demultiplexed light of light from the input transmission path, wherein the second monitor portion monitors reference light that is output from the reference light source and is wavelength division demultiplexed at the input-side wavelength mux/demux elements when light input from the input transmission paths is being waited.

4. The optical node apparatus according to claim 2, further comprising a control information storage portion that stores control information for establishing light destination paths for propagating frame signal light between the input ends and the output ends in the switch module;

a control portion that refers to the control information stored on the control information storage portion and controls switching of the input ends and the output ends in the switch module; and an update control portion that controls to update, on the basis of a monitor result in the monitor portion, the control information stored on the control information storage portion according to combinations of the input ends and the output ends defining the light destination paths that are switchable in the switch module.

5. The optical node apparatus according to claim 4, wherein the switch module is configured as a deflection light switch that comprises a deflection element that deflects input light upon supplying a driving voltage and wherein light destination paths are established between the input ends and the output ends upon the supplying the driving voltage, and the control portion comprises:

a driving voltage control portion that receives information related to the combinations of the input ends and the output ends to be established as the light destination paths, and outputs a control signal that controls the driving voltage to be supplied to the switch module by referencing to contents stored on the control information storage portion; and a driving voltage supply portion that supplies, to the switch module, the driving voltage controlled by the control signal from the driving voltage control portion, wherein the update control portion controls to update, on the basis of a monitor result from the monitor portion, information that is stored on the control information storage portion as the control information for controlling the driving voltage related to a light destination path to be controlled to update.

6. The optical node apparatus according to claim 5, wherein the light destination path to be controlled to update by the update control portion is a light destination path that is waiting for being switched between the input transmission path and the output transmission path in the switch module.

7. The optical node apparatus according to claim 1 wherein the reference light source outputs multi-wavelength light in a wavelength band that is substantially comparable to the wavelength band of the frame signal light.

8. The optical node apparatus according to claim 1 wherein the reference light source outputs multi-wavelength light in a wavelength band that is substantially different from the wavelength band of the frame signal light.

9. The optical node apparatus according to claim 1 wherein each of the pa input-side wavelength mux/demux elements and the pb output-side wavelength mux/demux elements is an arrayed-waveguide grating.

10. The optical node apparatus according to claim 1, wherein the switch module further comprises a wavelength converting portion that carries out wavelength conversion on input light;

an output end that directs the switched light to the wavelength converting portion; and an input end that reinputs the light wavelength converted by the wavelength converting portion to the switch module thereby outputting to an output end coupled to one of the output transmission paths.

11. An optical node apparatus comprising:

pa input-side wavelength mux/demux elements that are capable of receiving wavelength division multiplexed frame signal light input from pa input transmission paths and wavelength division demultiplexing and outputting the signal light, the number pa being one or greater;

a switch module comprising:
- input ends, the number of the input ends being equal to pa times a maximum accommodating number of the wavelength division multiplexing of the wavelength division multiplexed frame signal light; and
- output ends, the number of the output ends being equal to pb times the number of the maximum accommodating number of the wavelength division multiplexing, pb being at least two;

wherein each frame signal light that is wavelength division demultiplexed by an input-side wavelength mux/demux element is received at a corresponding input end, and each frame signal light that is received at the input end is output from one of the output ends which is related to each wavelength and is coupled to one of the pb output transmission paths, the number pb is at least two;

pb output-side wavelength mux/demux elements that are capable of wavelength division multiplexing frame signal light for an output transmission path in the switch module for each of the output transmission paths;

a reference light source that monitors and controls the switch module, the reference light source being capable of outputting as reference light multi-wavelength light having a wavelength bandwidth that covers a demultiplexing resolution at the input-side wavelength mux/demux elements and the output-side wavelength mux/demux elements, and each of the pb output-side wavelength mux/demux elements comprises at least two first ports and at least two second ports, one of the first ports included in each output-side wavelength mux/demux element is coupled to the corresponding output transmission path, the other of the first ports is coupled to the reference light source, and each second port is coupled to each of the output ends of the switch module.

12. The optical node apparatus according to claim 11, wherein each of the pa input-side wavelength mux/demux elements includes at least two first ports and at least two second ports, one of the first ports included in each input-side wavelength mux/demux elements is coupled to the input transmission path, and each second port is coupled to each of the input ends of the switch module, and a first monitor portion that is coupled to the other of the first ports of the pa input-side wavelength mux/demux elements and monitors reference light from the reference light source.

13. The optical node apparatus according to claim 11, further comprising:

a second monitor portion that is provided between the second ports of the pa input-side wavelength mux/demux elements and input ends of the switch module and monitors wavelength division demultiplexed light of the reference light that is output from the reference light source and is transmitted through the switch module or light from the input transmission path.

* * * * *